US008157206B2

(12) United States Patent
Gionta et al.

(10) Patent No.: US 8,157,206 B2
(45) Date of Patent: Apr. 17, 2012

(54) TWO-MOTION WING-FOLD MECHANISM WITH INDEPENDENT LOAD PATH

(75) Inventors: Matthew Gionta, Tehachapi, CA (US); James Crocoll, Mojave, CA (US); Jon Karkow, Tehachapi, CA (US); Paul Nicholas, Burbank, CA (US); Scott Bledsoe, Bluffton, SC (US)

(73) Assignee: Icon Aircraft, Inc., Los Angeles, CA (US)

( * ) Notice: Subject to any disclaimer, the term of this patent is extended or adjusted under 35 U.S.C. 154(b) by 373 days.

(21) Appl. No.: 12/482,308

(22) Filed: Jun. 10, 2009

(65) Prior Publication Data

US 2011/0180657 A1 Jul. 28, 2011

Related U.S. Application Data

(60) Provisional application No. 61/060,800, filed on Jun. 11, 2008.

(51) Int. Cl.
*B64C 3/56* (2006.01)
(52) U.S. Cl. ........................................................ 244/49

(58) Field of Classification Search .................... 244/46, 244/49, 39, 45 R, 218, 219
See application file for complete search history.

(56) References Cited

U.S. PATENT DOCUMENTS

| | | | | |
|---|---|---|---|---|
| 4,824,053 | A * | 4/1989 | Sarh | 244/218 |
| 5,192,037 | A * | 3/1993 | Moorefield | 244/46 |
| 6,082,665 | A * | 7/2000 | Spitzer | 244/2 |

* cited by examiner

*Primary Examiner* — Timothy D Collins
*Assistant Examiner* — Nicholas McFall
(74) *Attorney, Agent, or Firm* — Martensen IP; Michael C. Martensen (57) ABSTRACT

An aircraft wing folding system folds an outboard wing section relative to an inboard wing section between a deployed position and a stored position in two discrete motions where each motion has an independent load path separate of the loading of the wing experienced by in-flight aerodynamic forces. The wing-fold mechanism of the present invention includes a fold assembly comprising a twist component and a fold component operable to fold the outboard wing section from the deployed position to the stored position that remains substantially unloaded with respect to in-flight aerodynamic forces when the wing is in the deployed or flight configuration.

11 Claims, 9 Drawing Sheets

TWO-MOTION WING-FOLD MECHANISM WITH INDEPENDENT LOAD PATH

RELATED APPLICATION

The present application relates to and claims the benefit of priority to U.S. Provisional Patent Application No. 61/060,800 filed Jun. 11, 2008, which is hereby incorporated by reference in its entirety for all purposes as if fully set forth herein.

BACKGROUND OF THE INVENTION

1. Field of the Invention

Embodiments of the present invention relate, in general, to mechanisms used to fold wings on an aircraft and more particularly to a two-motion wing-fold mechanism with an independent flight load path.

2. Relevant Background

Many modern-day aircraft, especially military aircraft, are equipped with wing sections that can be folded such that when not spread or deployed for flight operations the wings are placed in a position that allows the aircraft to be stored in an efficient manner. Examples of such aircraft include carrier based airplanes in which the wings fold for compact storage on and below the carrier deck.

Typically, the mechanisms that fold wings must securely lock the wings in the deployed position for flying and, in the case of carrier based aircraft, must lock the wings in the stored position so they do not deploy to spread position due to wind or other forces on the carrier deck. Aerodynamic loads on the outboard wing sections create large moments on such folding mechanisms in both deployed and stored positions. Typically the load experienced by the outboard wing section relative to an inboard wing section is conveyed to the fuselage or inboard section via the same mechanism that acts to rotate the wing into its fully folded or stored position. While the actuating mechanism has the ability to lock in either the deployed or stored position, the load nonetheless is conveyed via the mechanism thus increasing the mechanism's complexity, robustness and weight. In large or heavy military aircraft, such as those found on an aircraft carrier, the added weight with respect to the actuation mechanism needed to withstand such a load as well as fold and store a wing is minimal with respect to the weight of the aircraft. However in smaller, light utility or recreational aircraft, weight of a wing-fold mechanism becomes a significant percentage of the total aircraft weight.

The prior art shows two primary strategies for folding an aircraft's wings. The first is to hinge the wing at a single station and fold the wings so that the wingtips meet above the fuselage or come to rest in a vertical position to reduce lateral displacement. This type of wing-fold can be seen on the F-18 Hornet, the F-4 Phantom and the A-1 Skyraider. A spanwise folding of the wings can result in the aircraft having a large height when wings are in the folded configuration. This raises the center of gravity of the aircraft, which makes it more unstable during ground operations. In addition a spanwise wing-fold mechanism is inherently heavy and complex as a natural upward loading of the wing during flight is in the same direction as the wing-fold loading. Since the flight loads are passed directly through the wing-fold joint itself the mechanism must be designed to be especially robust and heavy.

The second design commonly found in the prior art folds the wings parallel to the fuselage. This technique generally uses a single motion to pivot the wings through an axis oblique to the fuselage or principal axis of the aircraft. This type of wing-fold is embodied in much of the Grumman Corporation's carrier based aircraft. A single motion parallel fold also has undesirable characteristics. A single motion fold requires a section of the upper or lower surface of the wing to be removed or repositioned in order for the outboard folding wing component not to intersect with the stationary inboard section. Single motion folds also arc the wing tip high or low with respect to the fuselage during the folding process. Since ground clearance typically prevents the wing from folding low, the folding mechanism folds the wing high. This motion is not compatible with aircraft having a high T-tail or other structures that place constraints in the wing-fold's path due to possible interference concerns. Furthermore this type of wing-fold can also raise the aircraft's center of gravity making it less stable during ground operations.

Another challenge with the wing-fold mechanisms of the prior art, especially with amphibious aircraft, is reliability and resistance in light of corrosion and general wear and tear. Any mechanism with repeated use will experience a general degradation in performance. Frequent exposition to water as would be experienced by an amphibious aircraft heightens this degradation. To compensate for such degradation the wing-fold mechanisms are typically over engineered resulting again in increased weight and complexity.

The need therefore remains for a single wing-fold mechanism that is both simple and lightweight and that separates the wing-fold actions from the in-flight wing loading. These and other improvements of the prior art are hereafter described by way of example.

SUMMARY OF THE INVENTION

Hereafter described in various embodiments and by way of example is a two-motion wing-fold mechanism with independent load paths. According to one embodiment of the present invention, an aircraft wing folding system can fold an outboard wing section relative to an inboard wing section between a deployed position and a stored position in two discrete motions where each motion has an independent load path separate of the loading of the wing experienced by in-flight aerodynamic forces. According to one version of the present invention, the wing-fold mechanism includes a fold assembly comprising a twist component and a fold component operable to fold the outboard wing section from the deployed position to the stored position. Unlike wing-fold designs of the prior art, the wing-fold mechanism remains substantially unloaded with respect to in-flight aerodynamic forces when the wing is in the deployed or flight configuration.

The wing-fold mechanism of the present invention includes a first device or twist component interposed between and rotationally coupling the outboard wing section to the inboard wing section wherein the first device rotates the outboard wing section about the longitudinal axis of the wing relative to the inboard wing section. A second device or fold component, responsive to the first device rotating the outboard wing section about the wing's longitudinal axis, pivots or folds the first wing section about a second axis into a storage position.

According to another aspect of the present invention, a first spar associated with the inboard wing section overlaps a second spar associated with the outboard wing section when the wing is in the deployed or flight configuration. Spar pins structurally couple the two overlapping spars and convey in flight aerodynamic loads experienced by the outboard wing section to the inboard wing section independent of the folding mechanism. Moreover the spar pins can be engaged or disengaged independent of the folding mechanism.

From the flight or deployed configuration the wing spar pins are removed thus decoupling the outboard wing section from the inboard wing section. With the spar pins removed the twist actuator rotates the outboard wing section substantially 90° with respect to the inboard wing section. With the outboard wing section substantially perpendicular to the inboard wing section a fold actuator then folds the wing rearward to a stored position. The static load or weight of the outboard wing section is carried by the twist component and the fold component of the wing folding mechanism independently during each component's actuation.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Embodiments of the present invention, described hereafter by way of example, show a wing-fold mechanism that repositions an outboard wing section from a deployed or flight configuration to a stored or folded configuration in two independent motions. The components associated with each motion carry the static load of the outboard wing section independently. Furthermore the wing-fold mechanism is independent of the in-flight aerodynamic loads experienced by the outboard wing section with respect to the inboard wing section. As a result the wing-fold mechanism is optimized to maneuver and store the outboard wing section without having to be structurally sound enough to carry aerodynamic loads. This results in a significant weight savings in the design of a reliable and cost effective means to fold and store an outboard wing section for a light/recreational aircraft.

Figure 1A:
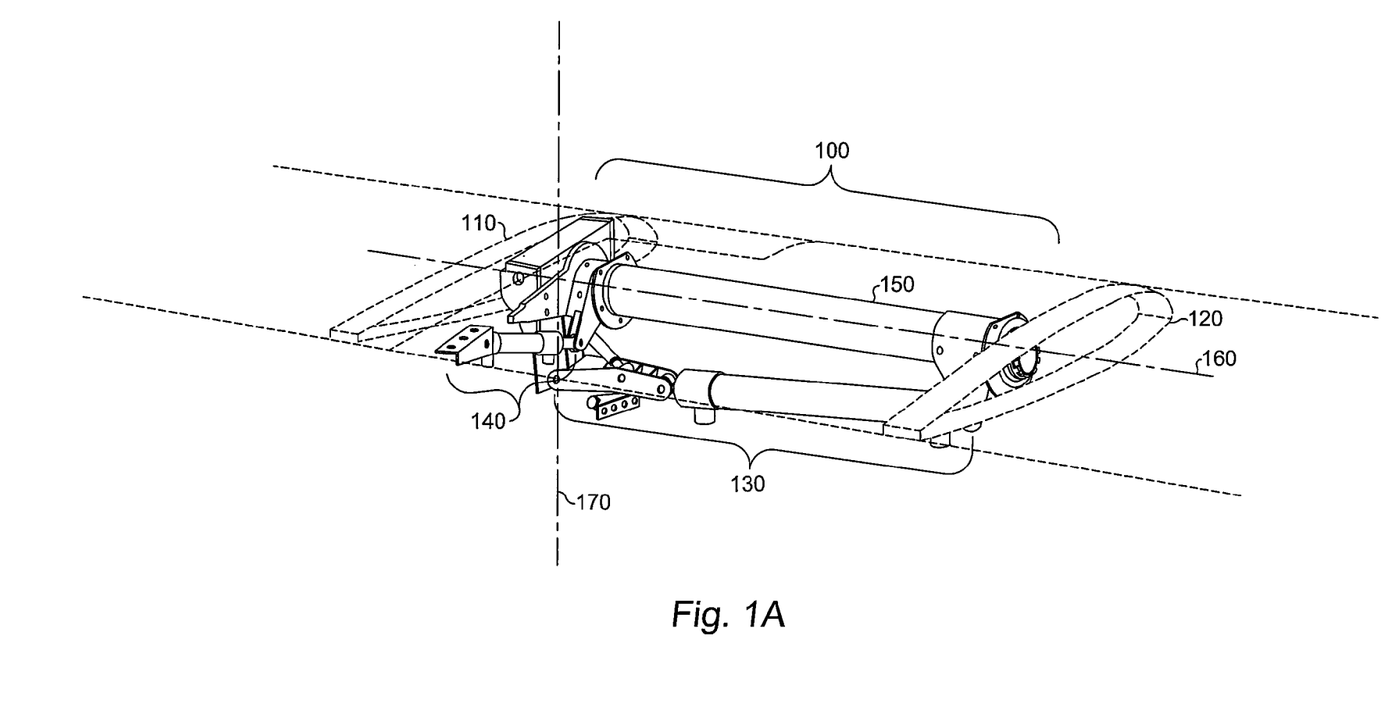
FIGS. 1A, 1B, and 1C show a wing-fold mechanism in various states of operation according to one embodiment of the present invention.
Figure 1B:
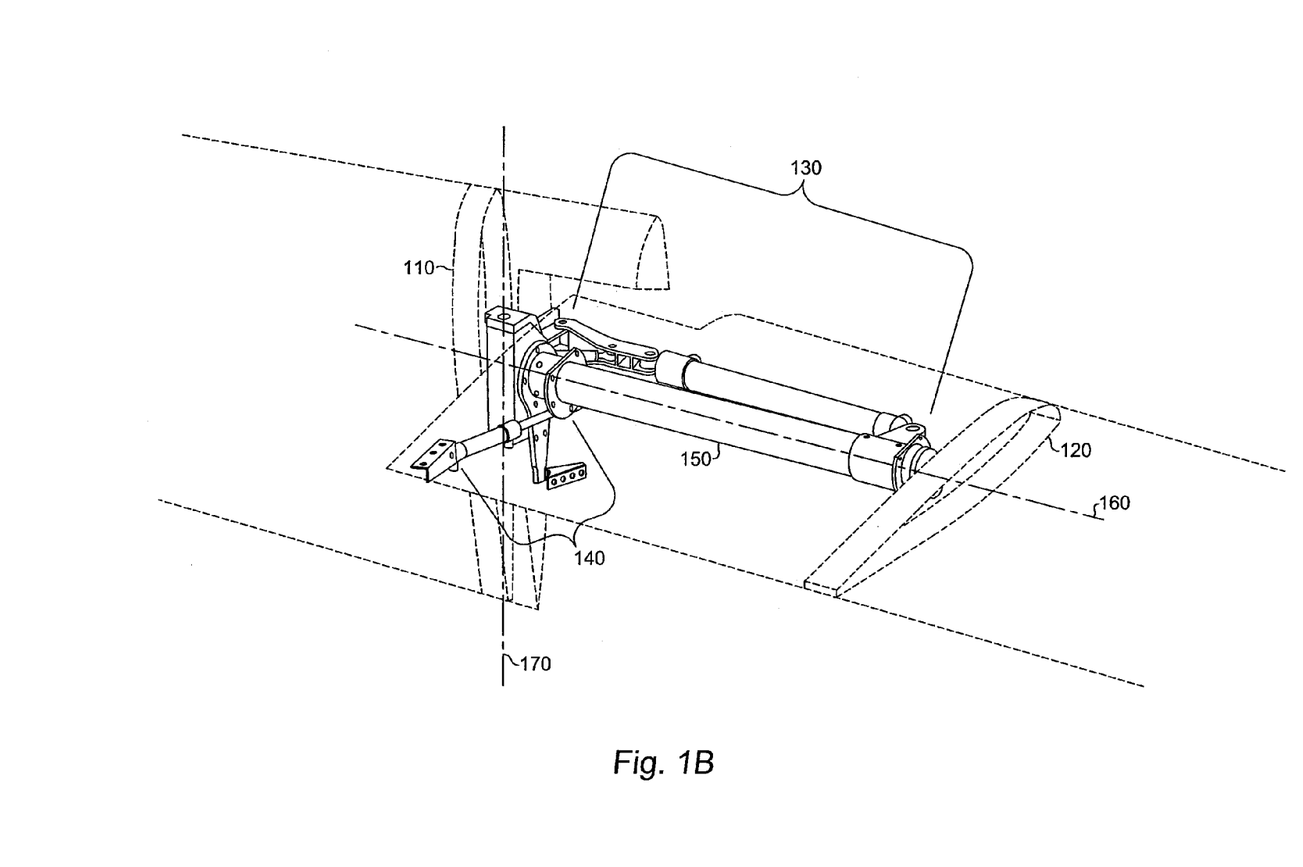
Figure 1C:
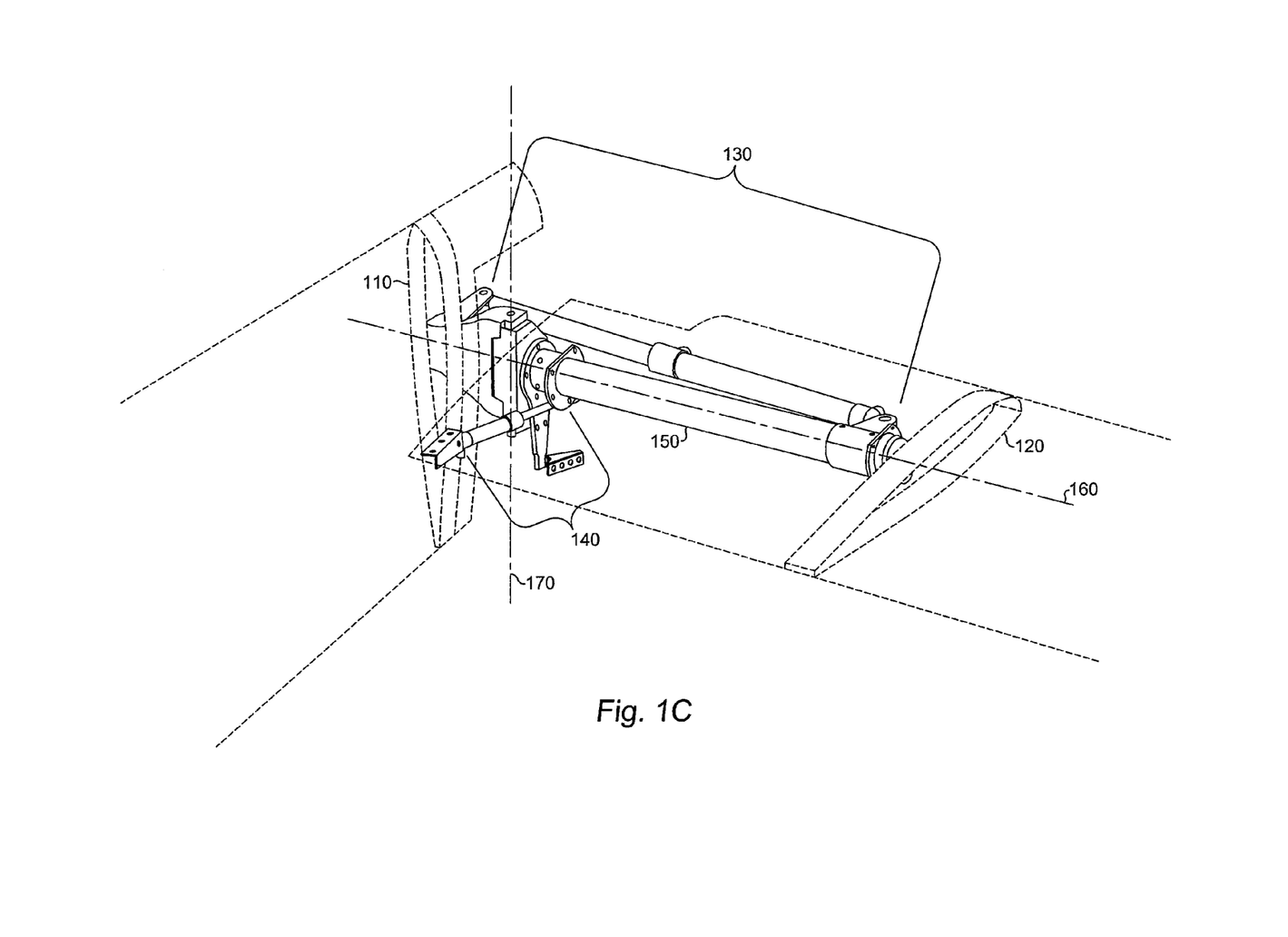

FIGS. 1A, 1B, and 1C show a cut away perspective view of the wing-fold mechanism in three different states of implementation according to one embodiment of the present invention. As shown in FIG. 1A, an outboard wing section 110 is coupled to an inboard wing section 120 via a wing-fold mechanism 100. Note that the interaction of the spar pins with respect to aerodynamic loading is not shown in this Figure and is described in a subsequent section. In this depiction the wing-fold mechanism comprises a tube 150 as the primary structural component, a rotational or twist component 140, and a folding or pivot component 130. In FIG. 1A, the outboard wing section 110 is configured to match the inboard wing section 120 and be in the deployed or flight configuration.

Upon initiation of the folding mechanism, the twist component 140 rotates the wing-fold mechanism 100 with respect to the inboard wing section 120. As shown, the outboard wing section 110 and the folding mechanism 100 rotate approximately 90° with respect to the inboard wing section 120. This rotation is about an axis 160 co-linear with the tube 150. The tube is, in one embodiment of the present invention, coupled to the wing box of the inboard wing section 120. According to one embodiment of the present invention, when the twist component 140 rotates the outboard wing section 110 approximately 90° with respect to the inboard wing section 120, the outboard wing section 110 reaches a stop which assists in isolating the twist component 140 and the tube 150 from loads generated while folding the outboard wing section 110 rearward. While a portion of the loads generated from the folding of the outboard wing section 110 toward to rear are always carried by the tube 150, the stop assists in isolating that load so as enable a reduction in the overall robustness and weight of the various components of the folding mechanism.

Once the outboard wing section 110 is approximately 90° with respect to the inboard wing section 120, the fold or pivot component 130 extends and rotates the outboard wing section 110 about an axis 170 that is substantially 90° with respect to the rotational axis 160. For the purpose of the present invention a rotational axis 160 is defined as an axis running from the wing tip associated with the outboard wing section 110 to the wing root associated with the inboard wing section 120. One skilled in the relevant art will recognize that this axis runs parallel to the length of wing when the wing is in its flight or deployed configuration. Furthermore it is acknowledged that is definition is to be viewed in light of a straight wing configuration rather than a configuration having a swept wing. While the concepts of the present invention apply equally to swept wing aircraft as they do to a straight wing configuration, the applicability of the present invention is recognized to likely directed to light aircraft having a straight wing configuration. The pivoting or folding axis 170 is substantially perpendicular to the rotational axis 160 and whose origin resides at the juncture of the inboard wing section 120 and the outboard wing section 110.

Figure 2:
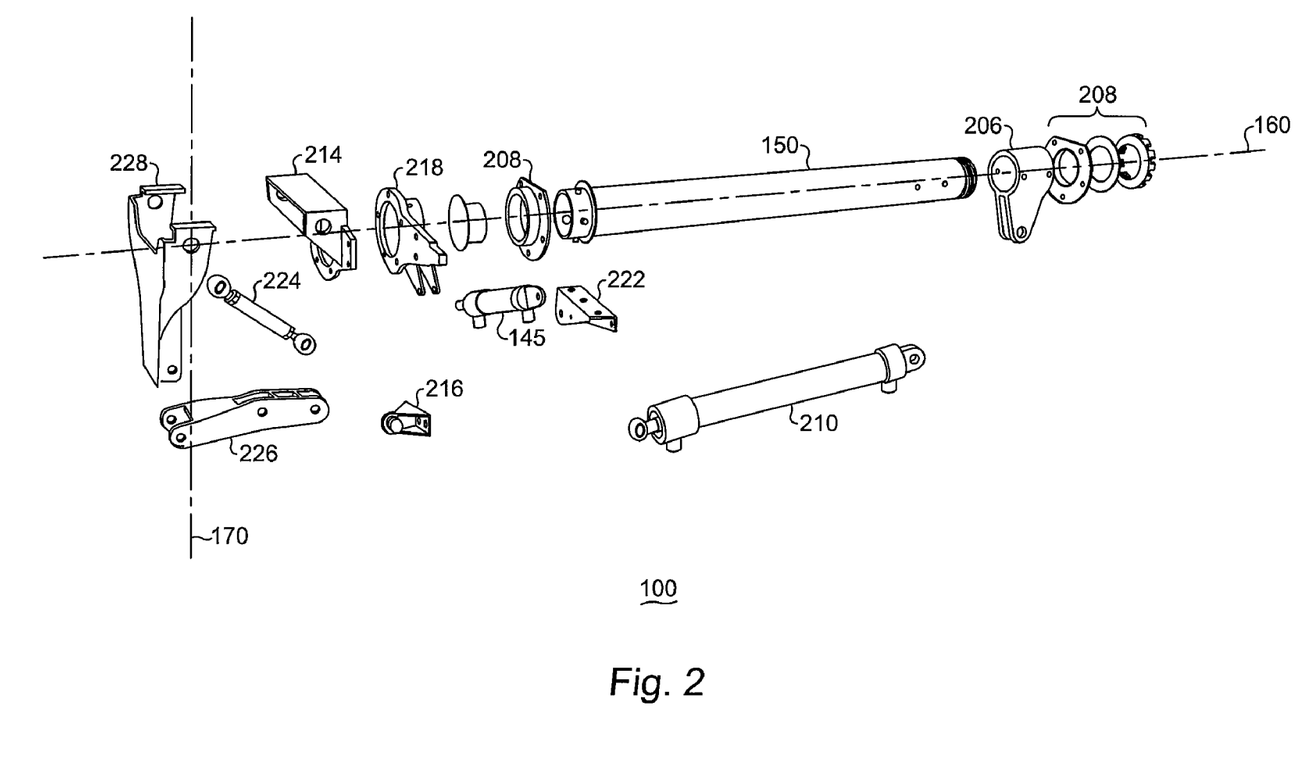
FIG. 2 shows an exploded view of the components of the wing-fold mechanism according to one embodiment of the present invention.

Turning in addition to FIG. 2, an exploded view of the wing-fold mechanism 100 of the present invention is shown. A tube 150 or similar structural number is coupled to the inboard wing section 120 via a tube attach fitting 206 and a bearing assembly 208. The bearing assembly 208 allows the tube 150 to rotate about the rotational axis 160. The tube 150 is also coupled to a crank 218 which is attached to a twist actuator 145 and a twist attach fitting 222. Outboard of the crank 218 with respect to the tube 150, an inboard hinge 214 is coupled to an outboard hinge 228. The outboard hinge 228 is thereafter affixed to the outboard wing section 110.

The outboard hinge 228 is also coupled to a fold actuator 210 via a fixed link 226 and an adjacent link 224. Upon activation the twist actuator 145 rotates the tube 150 and its associated components via the crank 218, in addition to the inboard hinge 214, the outboard hinge 218, and the fold actuator 210 with its associated components. Once the fold mechanism 100 has been rotated about the rotational axis 160, the fixed and adjacent link 226, 224 intersect with a twist stop 216. The twist stop 216 engages the wing box or another structure associated with the inboard wing section 120. The twist component 14 never supports to the weight of the outboard wing section 110 as the wing is balanced about the rotational axis 160. The fold actuator 210 thereafter extends the outboard hinge 228 with respect to the inboard hinge 214. The extension of the outboard hinge 228 with respect to the inboard hinge 214 pivots the outboard wing section 110 with respect to the inboard wing section 120.

One skilled in the relevant art will recognize that the specific configuration of the wing-fold mechanism 100 is one of design choice and should not be used to construe or limit the subject matter of that which is claimed. Indeed concepts with respect to a two-motion wing-fold mechanism with independent load paths can be implemented in a plurality of ways, all of which are hereby contemplated.

FIGS. 3A, 3B, 3C, 3D, and 3E show a series of implementations of the two-motion fold mechanism according to one embodiment of the present invention. Initially the outboard wing section 110 and inboard wing section 120 are aligned such that the spar associated with the outboard wing section 110 and the spar associated with the inboard wing section 120 are aligned and overlap.

As will be appreciated by one skilled in the relevant art, a wing experiences a variety of structural loads. At rest or when a wing is not employed to support the aircraft during flight, the weight of the wing creates a static load which must be carried by the fuselage. During flight, however, the wing produces lift which in turn carries the fuselage aloft. The aerodynamic forces experienced by the wing are not uniform. Depending on angle of attack and the shape of the airfoil a wing produces a varying pattern of low-pressure distributed generally over the upper surface of the airfoil. Typically the greatest region of low-pressure is found near the leading edge of the airfoil at a location in which the camber of the airfoil reaches a maximum. This distribution of low-pressure also varies along the length of the wing. The resulting force of the low-pressure produces lift, drag and a moment which tends to twist the wing. These forces are carried to the fuselage through what is referred to as a wing box. As would be familiar to one skilled in the relevant art, the term "wing box" as used herein should be taken to mean a wing's main beam assembly minus flaps, slats, various hydraulics, etc., which carries flight loads. The primary structure of the wing box includes one or more spars and one or more ribs. A spar runs from the wing tip to the wing root and is capable of conveying the in-flight aerodynamic loads to the fuselage. In the most basic of understandings the lift generated by the wing pulls the wing up, drag generated by the wing pushes the wing backwards, and the moment produces a twisting motion. While each load is important, the most significant of these loads is lift.

The wing-fold mechanisms of the prior art carry these loads through the folding mechanisms from the outboard wing section to the inboard wing section. According to one embodiment of the present invention, the wing-fold mechanism described herein is independent of aerodynamic forces originated by the outboard wing section. Moreover each component of the wing-fold mechanisms is independent of static forces experienced by the outboard wing section as the wings fold. The outboard wing section includes at least one spar, as does the inboard wing section. According to one embodiment of the present invention, the outboard wing section spar overlaps with the inboard wing section spar when the wing is in its deployed or flight configuration. These overlapping wing spars are joined by a plurality of pins referred to herein as spar pins. By placing the coupling spar pins in the overlapping wing spars instead of at the top and bottom of the wing section as done in the prior art, the spar pins can be separated by a greater distance to react the bending moments at the wing fold joint. This advantage greatly reduces the load at each pin junction, further increasing the structural efficiency, i.e. weight reduction of the joining mechanism.

Spar pins, according to the present invention, are oriented so as to be orthogonal to the rotational axis 160 and the folding axis 170. In such a mariner the in-flight aerodynamic loads experienced by the outboard wing section are conveyed to the inboard wing section by the overlapping spars via the spar pins and not the wing-fold mechanism. One skilled in the relevant art will recognize that the spar pins in their current orientation, in the present invention, are an effective means to convey lift and drag forces from the outboard wing section 110 to the inboard wing section 120. However the orthogonal orientation of the spar pins with respect to the rotational axis 160 and the folding axis 170 are an inefficient means to react to drag forces and pitching moments. Thus an additional spar pin oriented perpendicular to the juncture between the inboard wing section 120 and the outboard wing section 110 is located, in one embodiment of the present invention, near the trailing edge of the wing.

Figure 3A:
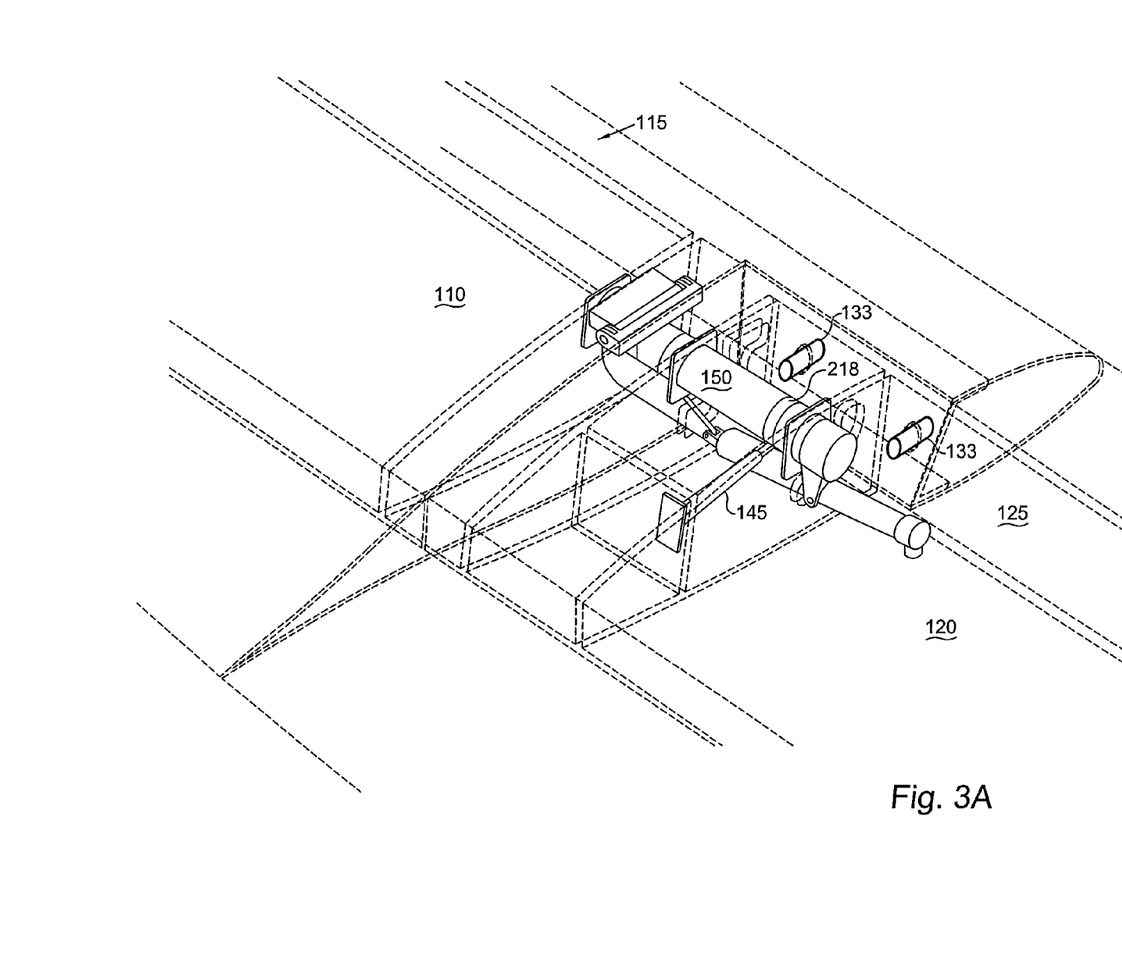
FIGS. 3A, 3B, 3C, 3D, and 3E show one embodiment of the wing-fold mechanism according to the present invention in a plurality of implementation configurations.

FIG. 3A shows the outboard wing section 110 and inboard wing section 120 aligned or configured in the deployed configuration as when the aircraft is ready for flight. In such a configuration the outboard spar 115 associated with the outboard wing section 110 overlaps the inboard spar 125 associated with the inboard wing section 120. In this depiction two or more spar pins 133 traverse the overlapped region to couple the outboard spar 115 to the inboard spar 125. Prior to the rotation of the outboard wing section 110 the spar pins 133 must be removed. Upon removal of the spar pins 133, the outboard wing section 110 is free to rotate about the rotational axis 160.

Figure 3B:
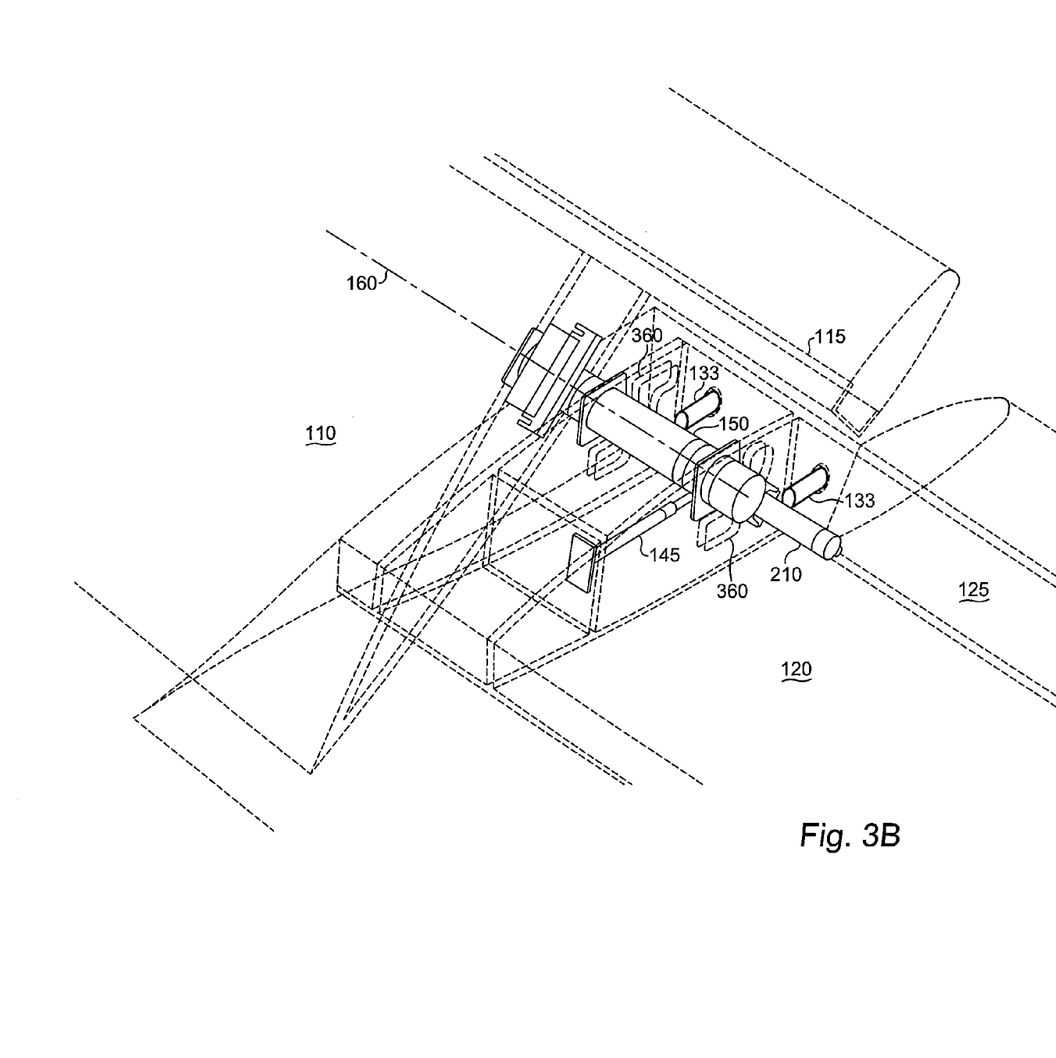

With the spar pins removed, initiation of the twist actuator 145 via the crank 218 rotates the tube 150 and associated components approximately 90°. FIG. 3B shows the actuator 145 partially extended with the outboard wing section 110 rotated approximately 45° with respect to the inboard wing section 120. As the twist actuator 145 continues to extend, the tube 150 and its associated components along with the fold actuator 216 continue to rotate about the rotational axis 160 along with the outboard wing section 110.

Figure 3C:
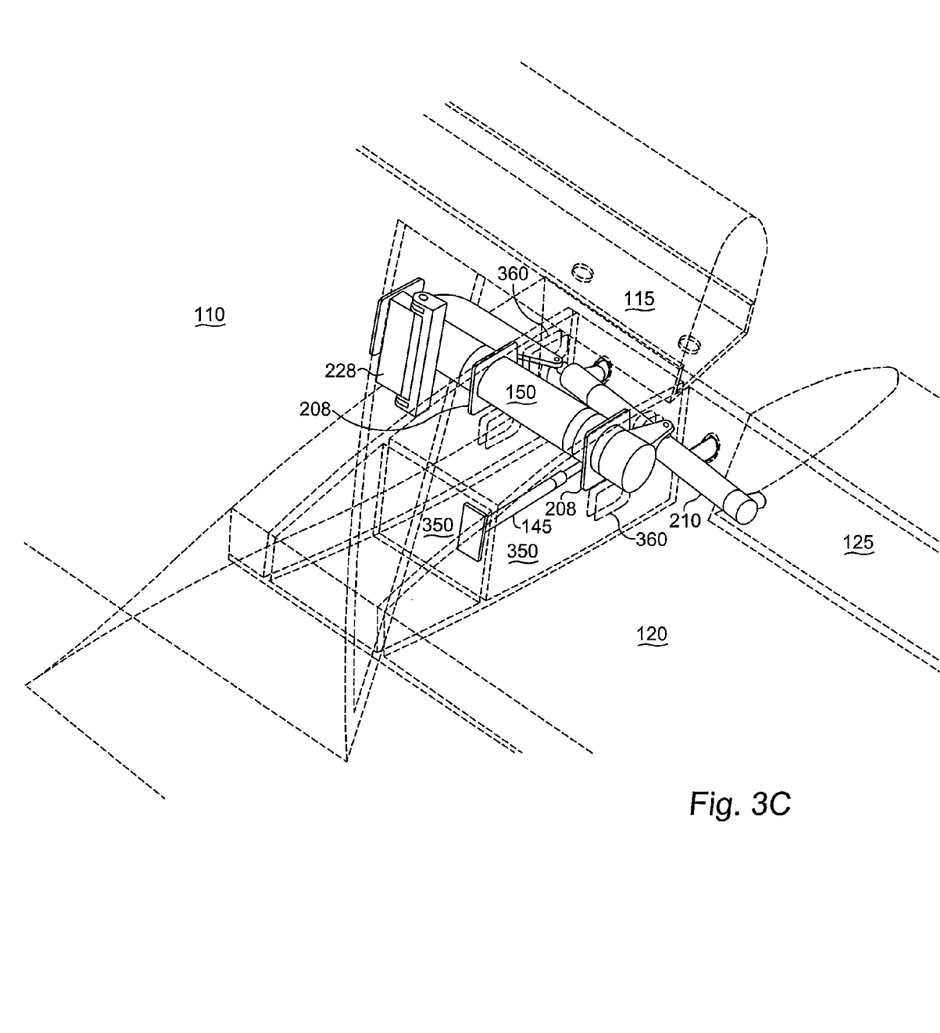

FIG. 3C shows twist actuator 145 fully extended with the fold actuator 210 and tube 150 rotated approximately 90°. Note that in this embodiment the twist actuator 145 is coupled to the wing box 350 as is the bearing assembly 208, associated with tube 150. Upon full extension of the twist actuator 145, a twist stop 216 (not shown) is positioned against the wing box to assist with static loads associated with the outboard wing section 110 with respect to the inboard wing section 120. The twist stop 216 holds the outboard wing section 110 in a twisted position suitable for the folding operation while the hinge 228 and the tube 150 support the cantilevered weight of the wing. Note that the fold actuator 210 rotates through a wing box channel 360 as the tube 150 rotates.

Figure 3D:
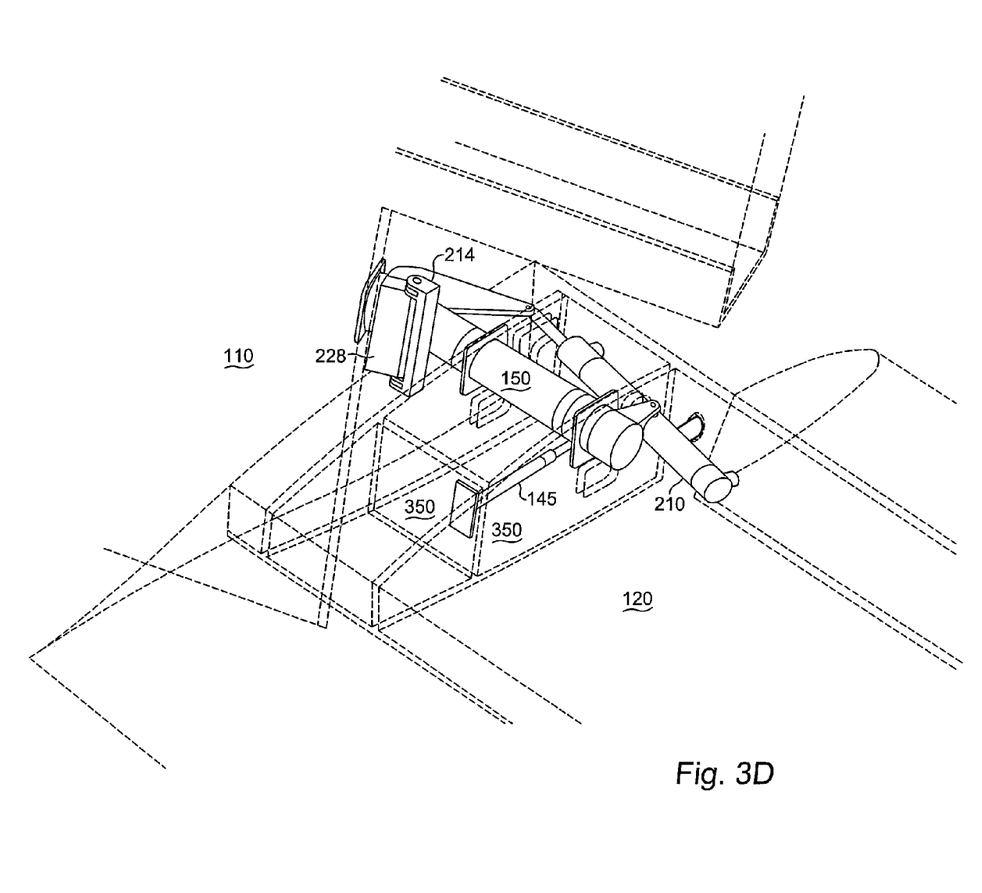

FIG. 3D shows the outboard wing section 110 partially folded rearward with respect to the inboard wing section 120. As the outboard wing section 110 is folded backwards, the weight of the outboard wing section 110 is substantially conveyed from the outboard hinge 228 to the inboard hinge 214 and to the wing box 350 via the tube 150.

Figure 3E:
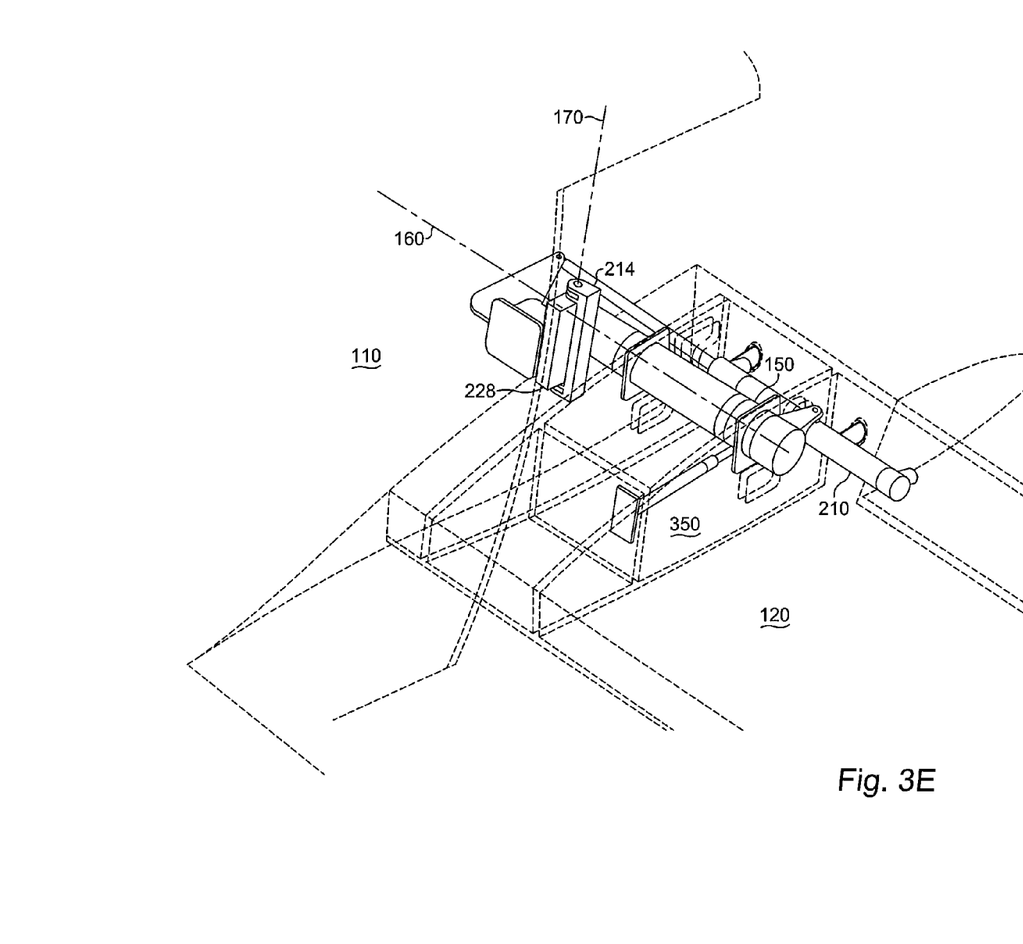

As a fold actuator 210 fully extends, the outboard wing section 110 continues to fold rearward until it reaches storage location or configuration. FIG. 3E shows the outboard wing section 110 fully rotated about the fold axis 170 and the fold actuator 210 fully extended. In the present configuration the outboard wing section 110 is folded back approximately 90° with respect to the leading edge of the wing.

Embodiments of the present invention describe a two-motion wing-fold mechanism in which loads, both static and dynamic, are channeled through independent paths. By differentiating the conveyance of static (non-flight) and the flight loading from the outboard wing section to the inboard wing section the wing-fold mechanism of the present invention can be designed with substantial weight savings and reduced complexity.

While the invention has been particularly shown and described with reference to embodiments, it will be understood by those skilled in the art that various other changes in the form and details may be made without departing from the spirit and scope of the invention.

It is to be clearly understood that the two-motion wing-fold mechanism of the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A wing-fold assembly for use in aircraft that provides for relative movement of a first wing section about a second wing section that when in a deployed configuration form a wing having a first axis spanning from a wing tip associated with the first wing section to a wing root associated with the second wing section, the wing-fold assembly comprising:
    a first device interposed between and rotationally coupling the first wing section to the second wing section wherein the first device rotates the first wing section at a point of rotation about the first axis of the wing relative to the second wing section; and
    a second device operable to pivot the first wing section about a second axis responsive to the first device rotating the first wing section about the first axis, the second axis being substantially perpendicular to the first axis and wherein loading of the first wing section as result of in-flight aerodynamic forces in the deployed configuration is conveyed to the second wing section independent of the first device and independent of the second device by a plurality of spar pins at the point of rotation substantially perpendicular to the first axis.

2. The wing-fold assembly of claim 1 wherein loading of the first wing section as result of in-flight aerodynamic forces is conveyed to the second wing section via the plurality of spar pins orientated substantially orthogonal to the first axis and the second axis.

3. The wing-fold assembly of claim 2 wherein the plurality of spar pins structurally mate the first wing section to the second wing section.

4. The wing-fold assembly of claim 2 wherein prior to rotation of the first wing section about the first axis the plurality of spar pins is disengaged.

5. The wing-fold assembly of claim 2 wherein the first wing section includes a first spar aligned with the first axis and the second wing section includes a second spar aligned with the first axis and when the wing is in the deployed configuration the first spar and the second spar overlap and are structurally mated by the plurality of spar pins.

6. The wing-fold assembly of claim 2 wherein structural loads carried by the plurality of spar pins are independent of structural loads carried by the first device and the second device.

7. A method for repositioning a first wing section with respect to a second wing section that when in a flight configuration form a wing, the wing defining a first axis spanning from a wing tip associated with the first wing section to a wing root associated with the second wing section, the method comprising:
    rotating by a first device the first wing section about the first axis with respect to the second wing section by a rotational component; and
    responsive to the first device rotating the first wing section, folding by a second device the first wing section about a second axis with respect to the second wing section by a folding component wherein the second axis is substantially perpendicular to the first axis and wherein weight of the first wing section is conveyed to the second wing section independent of loads induced by flight operations and wherein loading of the first wing section as result of in-flight aerodynamic forces is conveyed to the second wing section via a plurality of spar pins and independent of the rotational component and independent of the folding component.

8. The method of claim 7 further comprising disengaging the first wing section from the second wing section.

9. The method of claim 8 wherein disengaging comprises removing the plurality of spar pins prior to rotating the first wing section.

10. The method of claim 7 wherein a subset of the plurality of spar pins is orientated substantially orthogonal to the first axis and the second axis and conveys in-flight aerodynamic forces from the first wing section to the second wing section independent of the rotational component and independent of the folding component.

11. The method of claim 7 wherein the first wing section includes a first spar aligned with the first axis and the second wing section includes a second spar aligned with the first axis and wherein the first spar overlaps the second spar in the flight configuration and are structurally mated by the plurality of spar pins, a subset of the plurality.

* * * * *